US011879381B2

(12) United States Patent
Hedberg et al.

(10) Patent No.: US 11,879,381 B2
(45) Date of Patent: Jan. 23, 2024

(54) TWO-STROKE ENGINE, AND HANDHELD POWER TOOL

(71) Applicant: HUSQVARNA AB, Huskvarna (SE)

(72) Inventors: Markus Hedberg, Borås (SE); Niklas Enander, Gothenburg (SE); Tobias Stalfors, Gothenburg (SE)

(73) Assignee: HUSQVARNA, Huskvarna (SE)

( * ) Notice: Subject to any disclaimer, the term of this patent is extended or adjusted under 35 U.S.C. 154(b) by 0 days.

(21) Appl. No.: 17/619,639

(22) PCT Filed: Jun. 15, 2020

(86) PCT No.: PCT/SE2020/050623

§ 371 (c)(1),
(2) Date: Dec. 16, 2021

(87) PCT Pub. No.: WO2020/256624

PCT Pub. Date: Dec. 24, 2020

(65) Prior Publication Data

US 2022/0298961 A1 Sep. 22, 2022

(30) Foreign Application Priority Data

Jun. 19, 2019 (SE) .................................... 1950754-0

(51) Int. Cl.
*F02B 25/00* (2006.01)
*F02B 63/02* (2006.01)
(Continued)

(52) U.S. Cl.
CPC .............. *F02B 63/02* (2013.01); *F02B 25/22* (2013.01); *F02B 33/04* (2013.01); *F02B 2075/025* (2013.01)

(58) Field of Classification Search
CPC .... F02B 2075/025; F02B 37/22; F02B 33/02; F02B 63/02
See application file for complete search history.

(56) References Cited

U.S. PATENT DOCUMENTS 4,481,910 A 11/1984 Sheaffer
4,945,869 A * 8/1990 Klomp ...................... F01L 1/38
123/73 V (Continued)

FOREIGN PATENT DOCUMENTS

AT 397837 B 7/1994
CN 113107663 A * 7/2021

(Continued)

OTHER PUBLICATIONS

International Search Report and Written Opinion for International Application No. PCT /SE2020/050623 dated Jul. 28, 2020.

(Continued)

*Primary Examiner* — George C Jin
*Assistant Examiner* — Teuta B Holbrook
(74) *Attorney, Agent, or Firm* — Burr & Forman LLP

(57) ABSTRACT

A two-stroke engine (1) is disclosed comprising a cylinder (2), a piston (3) arranged to reciprocate in the cylinder (2), a crankcase (5), a fuel injector (7) configured to inject fuel into the crankcase (5), an air inlet (9) connected to the crankcase (5), and a stratified scavenging intake (11) connected to the cylinder (2). The engine (1) comprises a throttle (13) configured to control the amount of air supplied to the air inlet (9) and to the stratified scavenging intake (11). The present disclosure further relates to handheld power tool (50) comprising an engine (1).

11 Claims, 5 Drawing Sheets

(51) Int. Cl.
*F02B 25/22* (2006.01)
*F02B 33/04* (2006.01)
*F02B 75/02* (2006.01)

(56) References Cited

U.S. PATENT DOCUMENTS

| | | | | |
|---|---|---|---|---|
| 5,823,150 | A | 10/1998 | Konakawa | |
| 6,427,646 | B2 | 8/2002 | Galka et al. | |
| 7,224,741 | B1 | 5/2007 | Hadad | |
| 7,513,225 | B2 | 4/2009 | Geyser et al. | |
| 7,574,985 | B2 | 8/2009 | Kirchberger | |
| 8,215,278 | B2 * | 7/2012 | Kummermehr | F02M 13/04 123/184.52 |
| 8,733,318 | B2 | 5/2014 | Hoche et al. | |
| 9,938,889 | B2 | 4/2018 | Kurata et al. | |
| 9,988,970 | B2 * | 6/2018 | Ohsawa | F02M 35/10196 |
| 2004/0144343 | A1 | 7/2004 | Osburg et al. | |
| 2007/0057386 | A1 * | 3/2007 | Koizumi | F02B 25/22 261/44.8 |
| 2008/0035091 | A1 * | 2/2008 | Geyer | F02M 13/04 123/184.52 |
| 2014/0299099 | A1 * | 10/2014 | Yoshizaki | F02M 7/133 123/438 |
| 2015/0337765 | A1 * | 11/2015 | Yamazaki | F02M 9/08 261/64.2 |

FOREIGN PATENT DOCUMENTS

| | | | | |
|---|---|---|---|---|
| EP | 1705350 | A2 | 9/2006 | |
| EP | 3273048 | A1 | 1/2018 | |
| FR | 2904858 | A1 * | 2/2008 | F02B 25/22 |
| GB | 2142085 | A | 1/1985 | |
| JP | H01170758 | A | 7/1989 | |
| JP | 2001295652 | A * | 10/2001 | |
| JP | 2001295652 | A | 10/2001 | |
| JP | 2012077640 | A | 4/2012 | |
| JP | 7158257 | B2 * | 10/2022 | |

OTHER PUBLICATIONS

Search Report and Office Action for Swedish Application No. 1950754-0 dated Nov. 27, 2019.

* cited by examiner

TWO-STROKE ENGINE, AND HANDHELD POWER TOOL

TECHNICAL FIELD

The present disclosure relates to a two-stroke engine comprising a stratified scavenging arrangement. The present disclosure further relates to a handheld power tool comprising a two-stroke engine.

BACKGROUND

A two-stroke engine is a type of internal combustion engine which completes a power cycle with two strokes of the piston during only one crankshaft revolution. The uppermost position of a piston in a cylinder is usually referred to as the top dead centre and the lowermost position of the piston in the cylinder is usually referred to as the bottom dead centre. Compared to four-stroke engines, two-stroke engines have a greatly reduced number of moving parts, and consequently can be made more compact and significantly lighter. Therefore, two-stroke petrol engines are used in applications where mechanical simplicity, light weight, and high power-to-weight ratio are main concerns. Typical applications are hand-held tools such as chainsaws.

Most small sized two-stroke engines are crankcase-scavenged engines meaning that these engines use the area below the piston as a charging pump to build up pressure in the crankcase during the power stroke of the piston. Two-stroke engines are usually provided with a carburetor arranged to supply an air/fuel mixture to the crankcase. In the power stroke of a two-stroke engine, the increased pressure and temperature in the cylinder obtained by the combustion of fuel is partially converted into mechanical work supplied to a crankshaft of the engine. At the same time, the pressure in the crankcase increases as a result of the movement of the piston towards the bottom dead centre. An exhaust port arranged in the cylinder wall is opened to allow exhaust gases to flow out from the cylinder when the piston reaches a first position relative the cylinder in its movement towards the bottom dead centre. The piston continues the movement towards the bottom dead centre and when it reaches a second position, below the first position, an inlet port arranged in the cylinder wall is opened. The inlet port is fluidly connected to the crankcase via a scavenging channel. The air/fuel mixture in the crankcase is forced to flow into the cylinder via the inlet port by the overpressure in the crankcase.

Accordingly, as understood from the above, in this type of engine, the exhaust port, and the inlet port in the cylinder are open simultaneously in the scavenging phase of the engine, i.e. when the piston is in the region of a bottom dead centre. As a result thereof, some air/fuel mixture may flow through the cylinder from the inlet port to the exhaust port in the scavenging phase. Therefore, a problem associated with small sized two-stroke engines is emission of unburned hydrocarbon, i.e. unburned fuel. A way to counter this problem is to provide the engine with a stratified scavenging arrangement.

In such engines, the piston can be provided with an aperture arranged to superimpose the scavenging channel and a stratified scavenging intake in the cylinder wall when the piston is in a region of the top dead centre. When the piston is in this position, clean air, i.e. air without added fuel, can flow from the stratified scavenging intake into the scavenging channel. As a result thereof, when the piston reaches the second position, referred to above, in which the inlet port is opened, clean air will first enter the cylinder before the air/fuel mixture further down in the scavenging channel reaches the cylinder. In this manner, less fuel will flow out through the exhaust port in the scavenging phase and the emission of unburned hydrocarbon can thereby be significantly reduced.

Drawbacks with stratified scavenging arrangements are that they add costs, weight, and complexity to two-stroke engines. That is, the components and structures needed, such as channels, inlet ducts, throttling devices, and the like, add costs, weight, and complexity to two-stroke engines, and in general, on today's consumer market, it is an advantage if products, such as two-stroke engines and associated products, have conditions and/or characteristics suitable for being manufactured and assembled in a cost-efficient manner.

SUMMARY

It is an object of the present invention to overcome, or at least alleviate, at least some of the above-mentioned problems and drawbacks.

According to a first aspect of the invention, the object is achieved by a two-stroke engine comprising a cylinder, a piston arranged to reciprocate in the cylinder, a crankcase, a fuel injector configured to inject fuel into the crankcase, an air inlet connected to the crankcase, and a stratified scavenging intake connected to the cylinder. The engine further comprises a throttle configured to control the amount of air supplied to the air inlet and to the stratified scavenging intake.

Since the engine comprises a throttle configured to control the amount of air supplied to the air inlet and to the stratified scavenging intake, a simple, efficient, and reliable control is provided of the amount of air supplied to the air inlet and to the stratified scavenging intake. Moreover, since the engine comprises a fuel injector configured to inject fuel into the crankcase, conditions are provided for using a shared flow path between the throttle and the air inlet and the stratified scavenging intake.

Furthermore, since the engine comprises one throttle configured to control the amount of air supplied to the air inlet, as well as configured to control the amount of air supplied to the stratified scavenging intake, the need for a separate throttle device for controlling the amount of air supplied to the stratified scavenging intake is circumvented. As a result, an engine is provided having conditions for generating low amounts of unburned hydrocarbon during operation while the engine has conditions and characteristics suitable for being manufactured and assembled in a cost-efficient manner.

Moreover, since the need is circumvented for a separate throttle device for controlling the amount of air supplied to the stratified scavenging intake, an engine is provided having conditions for a reduced weight. In addition, since the need for a separate throttle device is circumvented for controlling the amount of air supplied to the stratified scavenging intake, an engine is provided having conditions for a simplified maintenance and repair. As an example, the need for synchronising a separate throttle device and an engine throttle device is circumvented.

Accordingly, a two-stroke engine is provided overcoming, or at least alleviating, at least some of the above-mentioned problems and drawbacks. As a result, the above-mentioned object is achieved.

Optionally, the engine comprises a manifold arranged between the throttle and the air inlet and the stratified scavenging intake. Thereby, a simple and reliable transfer of air is provided from the throttle to the air inlet and to the stratified scavenging intake. Moreover, the need for a separate manifold to the stratified scavenging intake is circumvented, which provides conditions for a further reduced weight of the engine.

Optionally, the engine comprises a separation wall between the air inlet and the stratified scavenging intake. Thereby, the occurrence of spit back is reduced in a simple and efficient manner. Spit back is a term describing events where fuel and/or an air/fuel mixture is transferred from the crankcase to the stratified scavenging intake via the air intake. Spit back that short-circuits to the stratified scavenging intake will increase the amount of fuel in the cylinder of the engine, which in turn may increase the amounts of unburned hydrocarbon generated during operation of the engine.

Optionally, the manifold comprises the separation wall. Thereby, the occurrence of spit back is reduced in a simple and efficient manner. Moreover, the length of the separation wall, measured in an intended air flow direction through the manifold, can be changed between different applications of the engine without having to change the design of the cylinder. In this manner, the response and characteristics of an engine can be changed between different applications of the engine without having to change the design of the cylinder. Accordingly, in this manner, engines for different applications with different response and characteristics can be provided in a cost-efficient manner.

Optionally, the length of the separation wall, measured in an intended air flow direction through the manifold, is within the range of 4-60%, such as within the range of 10-50%, of the length of the manifold measured in the intended air flow direction through the manifold. Thereby, it is ensured that the occurrence of spit back is reduced in a simple and efficient manner at higher rotational speeds of the engine. Furthermore, a well-designed amount of spit back obtained by the length of the separation wall can improve the engine low speed torque and acceleration.

Optionally, the manifold is provided in an elastic material. Thereby, a low amount of vibrations will be transferred from the cylinder to the throttle, and thereby also to an air filter arrangement which may be attached to the throttle, during operation of the engine.

Optionally, the piston is arranged to reciprocate between a bottom dead centre and a top dead centre in the cylinder, wherein the engine comprises a scavenging channel configured to conduct an air fuel mixture from the crankcase to the cylinder when the piston is in a region of the bottom dead centre, and wherein the piston comprises a mantle surface provided with an aperture arranged to superimpose the stratified scavenging intake and the scavenging channel when the piston is in a region of the top dead centre. Thereby, an engine is provided having conditions for generating low amounts of unburned hydrocarbon during operation while the engine has conditions and characteristics suitable for being manufactured and assembled in a cost-efficient manner.

Optionally, the engine comprises a valve arranged between the throttle and the stratified scavenging intake, and wherein the valve is controllable to a state in which the valve at least partially blocks flow of air to the stratified scavenging intake. Thereby, an engine is provided in which the amount of air supplied to the stratified scavenging intake can be controlled in a simple and efficient manner. As a further result thereof, an engine is provided in which the response of the engine can be controlled in a simple and efficient manner. As an example, an engine is provided in which the rotational speed of the engine can be limited simply by controlling the valve to the state in which the valve at least partially blocks flow of air to the stratified scavenging intake.

Optionally, the valve is a solenoid controlled valve. Thereby, an engine is provided in which the amount of air supplied to the stratified scavenging intake can be controlled in a simple and efficient manner.

Optionally, the engine comprises a control arrangement configured to control the valve based on a rotational speed of the engine. Thereby, an engine is provided in which the response of the engine is controlled in a simple and efficient manner.

Optionally, the control arrangement is configured to control the valve to the state in which the valve at least partially blocks flow of air to the stratified scavenging intake when the rotational speed of the engine is above a threshold rotational speed. Thereby, an engine is provided in which the rotational speed of the engine is limited in a simple and environmentally friendly manner. This because the at least partial block of the flow of air to the stratified scavenging intake will result in a higher fuel proportion in the cylinder which reduces the combustion temperature in the cylinder and reduces the power output of the engine. Previously, the rotational speed of two-stoke engines usually has been limited by cancelling ignition of a spark plug of the engine. Such a limitation of the rotational speed of an engine causes significant amounts of unburnt hydrocarbons.

Optionally, the throttle is arranged such the flow rate of air to the air inlet is higher than the flow rate of air to the stratified scavenging intake when throttle is in a half open position. Thereby, an engine is provided having conditions for an improved engine response while generating low amounts of unburned hydrocarbon during operation.

Optionally, the throttle comprises a butterfly valve element. Thereby, a simple and efficient control is provided of the amount of air supplied to the air inlet and to the stratified scavenging intake.

Optionally, the butterfly valve element comprises a first portion facing the air inlet and a second portion facing the stratified scavenging intake, and wherein the throttle is arranged such that the first portion is moved in a direction towards the air inlet and the second portion of the butterfly valve element is moved in a direction away from the stratified scavenging intake when the butterfly valve element is rotated from a closed position towards an open position. Thereby, an engine is provided having conditions for an improved engine response while generating low amounts of unburned hydrocarbon during operation. Moreover, an engine is provided having conditions for a facilitated start-up thereof. This because more air will be directed towards the air inlet than what is directed towards the stratified scavenging intake when the throttle is in an at least partially closed position.

According to a second aspect of the invention, the object is achieved by a handheld power tool comprising an engine according to some embodiments of the present disclosure.

Since the handheld power tool comprises an engine according to some embodiments, a handheld power tool is provided having conditions for generating low amounts of unburned hydrocarbon during operation while the handheld power tool has conditions and characteristics suitable for being manufactured and assembled in a cost-efficient manner.

Accordingly, a handheld power tool is provided overcoming, or at least alleviating, at least some of the above-mentioned problems and drawbacks. As a result, the above-mentioned object is achieved.

Optionally, the handheld power tool is a chainsaw or a power cutter.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
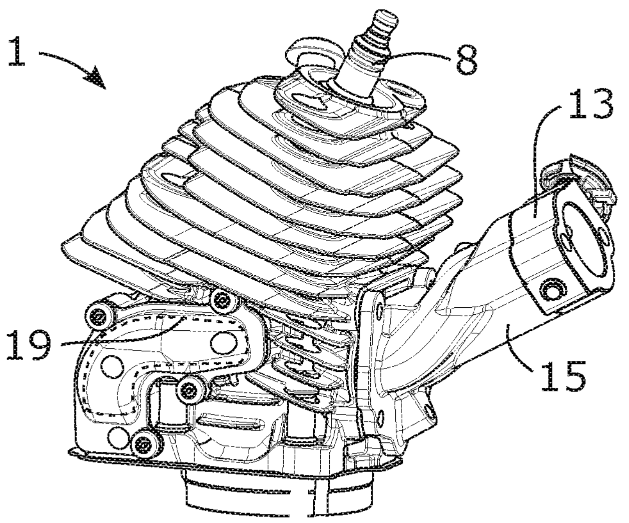
FIG. 1 illustrates a perspective view of a two-stroke engine according to some embodiments.

FIG. 1 illustrates a perspective view of a two-stroke engine 1, according to some embodiments. According to the illustrated embodiments, the two-stroke engine 1 is a small sized crankcase-scavenged two-stroke engine 1. As is further explained herein, the engine 1 is configured to power a tool of a handheld power tool. For the reason of brevity and clarity, the two-stroke engine 1 is in some places herein referred to as "the engine 1". In FIG. 1, some components of the engine 1 is visible, such as a spark plug 8, a throttle 13, a manifold 15, and a scavenging channel 19. The function and features of these components will be further explained in the following.

Figure 2:
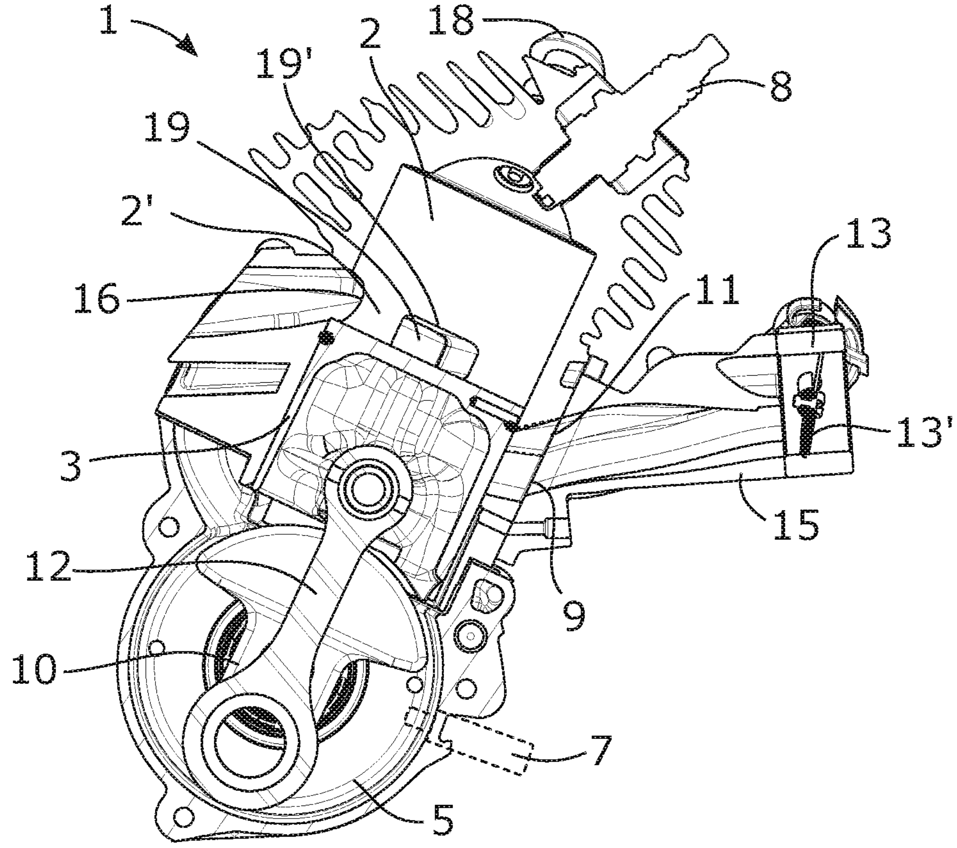
FIG. 2 illustrates a cross section of the engine illustrated in FIG. 1.

FIG. 2 illustrates a cross section of the engine 1 illustrated in FIG. 1. The engine 1 comprises a cylinder 2 and a piston 3 arranged to reciprocate in the cylinder 2. The engine 1 further comprises a crankcase 5 and a crankshaft 10 arranged to rotate in the crankcase 5. Moreover, the engine 1 comprises a connecting rod 12 connecting the piston 3 to the crankshaft 10 such that the piston 3 reciprocates in the cylinder 2 between a bottom dead centre BDC and a top dead centre TDC upon rotation of the crankshaft 10. In FIG. 2, the piston 3 is illustrated in the bottom dead centre.

The engine 1 further comprises a fuel injector 7 configured to inject fuel directly into the crankcase 5. The fuel injector 7 may be of a low-pressure type. Moreover, the engine 1 comprises an air inlet 9 connected to the crankcase 5, and a stratified scavenging intake 11 connected to the cylinder 2. Furthermore, the engine 1 comprises a throttle 13 configured to control the amount of air supplied to the air inlet 9 and to the stratified scavenging intake 11. According to the illustrated embodiments, the engine 1 comprises a manifold 15 arranged between the throttle 13 and the air inlet 9 and the stratified scavenging intake 11. As is further explained herein, the scavenging channel 19 indicated in FIG. 1 and FIG. 2 is configured to conduct an air fuel mixture from the crankcase 5 to the cylinder 2 when the piston 3 is in a region of the bottom dead centre.

Figure 3:
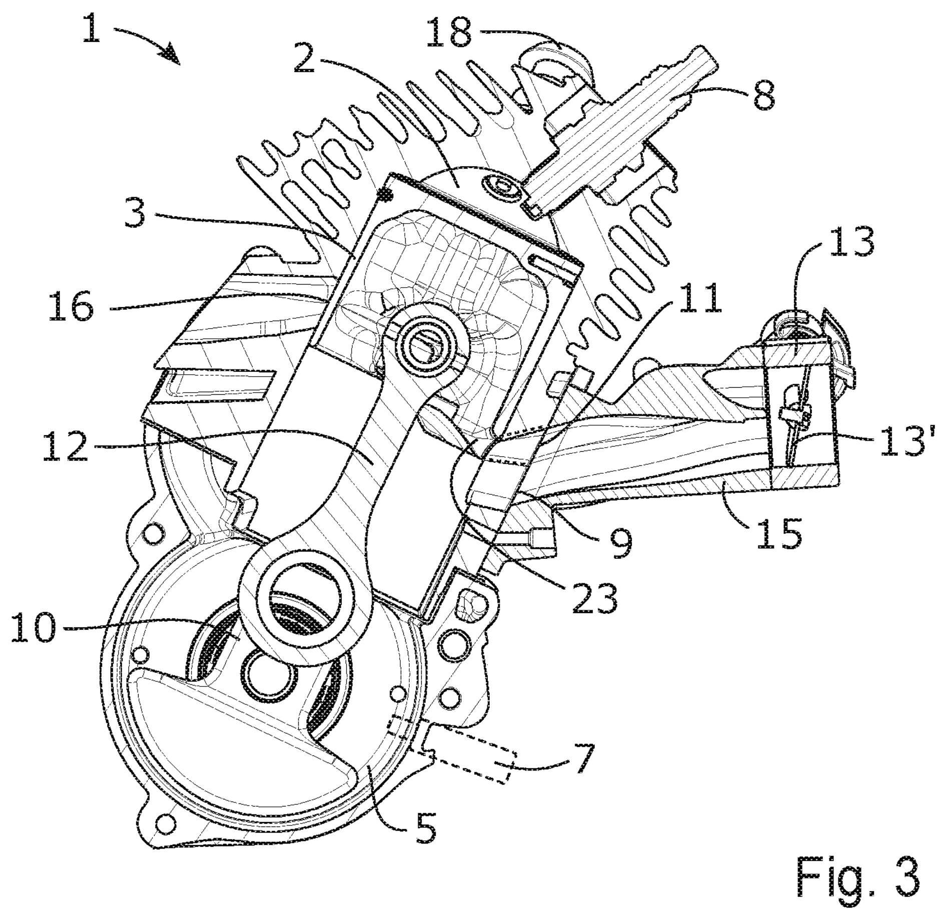
FIG. 3 illustrates the cross section of the engine illustrated in FIG. 2 in which a piston of the engine is illustrated in the top dead centre.

FIG. 3 illustrates the cross section of the engine 1 illustrated in FIG. 2 in which the piston 3 of the engine 1 is illustrated in the top dead centre. When the piston 3 is in the top dead centre, as illustrated in FIG. 3, air can flow from the throttle 13 into the crankcase 5 via the manifold and the air inlet 9. Moreover, when the piston 3 is in this position, the fuel injector 7 may inject fuel directly into the crankcase 5. Furthermore, as is further explained herein, when the piston 3 is in the region of the top dead centre, as illustrated in FIG. 3, air can flow from the throttle 13 into the scavenging channel 19 indicated in FIG. 2, via the stratified scavenging intake 11, recesses 23 in a mantle surface of the piston 3 and an inlet port 19' of the scavenging channel 19, indicated in FIG. 2. As can be seen in FIG. 3, the recess 23 in the mantle surface of the piston 3 superimposes the stratified scavenging intake 11 when the piston 3 is in a region of the top dead centre.

Figure 4:
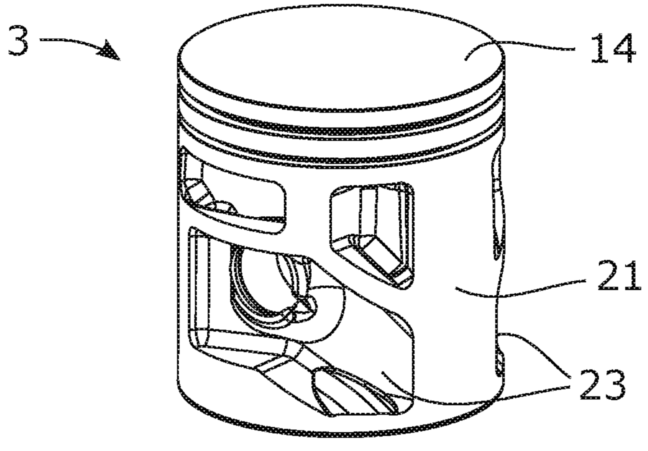
FIG. 4 illustrates a perspective view of the piston of the engine according to the embodiments illustrated in FIG. 1-FIG. 3.

FIG. 4 illustrates a perspective view of the piston 3 of the engine 1 according to the embodiments illustrated in FIG. 1-FIG. 3. As indicated in FIG. 4, the piston 3 comprises a piston top 14. The piston top 14 faces the combustion chamber of the cylinder 2 when the piston is arranged in the cylinder 2. Moreover, the piston comprises a mantle surface 21. In the following, simultaneous reference is made to FIG. 4 and FIG. 2. The mantle surface 21 faces cylinder walls 2' of the cylinder 2 when the piston 3 is arranged in the cylinder 2. The mantle surface 21 is provided with apertures 23 arranged to superimpose the stratified scavenging intake 11 and the inlet port 19' of the scavenging channel 19 when the piston 3 is in a region of the top dead centre.

Figure 5:
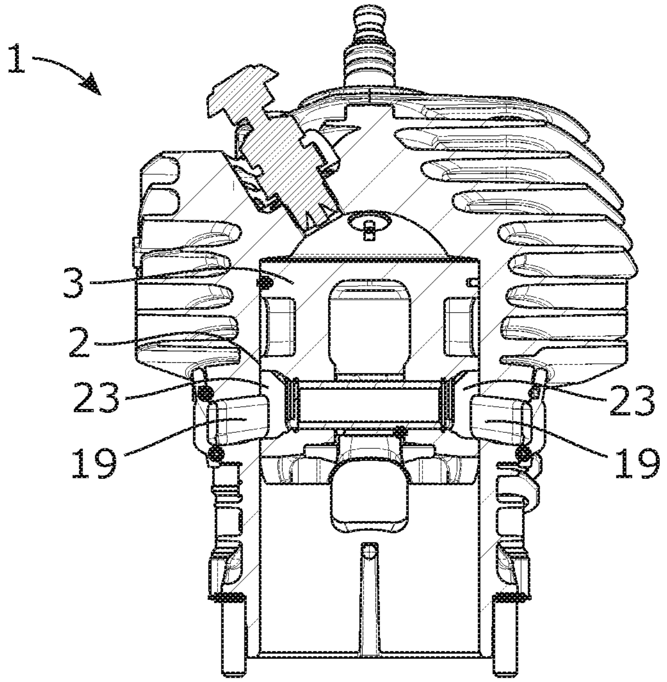
FIG. 5 illustrates a second cross section of the engine illustrated in FIG. 2 in which the piston is illustrated in the top dead centre.

FIG. 5 illustrates a second cross section of the engine 1 illustrated in FIG. 2 in which the piston 3 is illustrated in the top dead centre. As can be seen in FIG. 5, when the piston 3 is in a region of the top dead centre, the recess 23 in the mantle surface of the piston 3 superimposes the scavenging channel 19 in the cylinder 2.

In the following, the operation of the engine 1 will be explained with simultaneous reference to FIG. 2-FIG. 5 during two strokes, i.e. during one revolution of the crankshaft 10. As mentioned, when the piston 3 is in a region of the top dead centre, as illustrated in FIG. 3, air can flow from the throttle 13 into the crankcase 5 via the manifold 15 and the air inlet 9. Moreover, when the piston 3 is in a region of the top dead centre, the fuel injector 7 may inject fuel directly into the crankcase 5. According to some embodiments, the fuel injector 7 may inject fuel into the crankcase 5 in a continuous manner. Furthermore, when the piston 3 is in the region of the top dead centre, air can flow from the throttle 13 into the scavenging channel 19 indicated in FIG. 2, via the stratified scavenging intake 11, the recesses 23 in the mantle surface of the piston 3 and the inlet port 19' of the scavenging channel 19.

When the piston 3 moves from the top dead centre towards the bottom dead centre, a lower surface of the piston 3, which faces the crankcase 5, acts as a pump which increases the pressure in the crankcase 5. Moreover, when the piston 3 has moved a distance from the top dead centre, the mantle surface 21 of the piston 3 blocks the air inlet 9 and the stratified scavenging intake 11.

An exhaust port 16 arranged in a cylinder wall 2' of the cylinder 2 is opened to allow exhaust gases to flow out from the cylinder 2 when the piston 3 reaches a first position relative the cylinder 2 in its movement towards the bottom dead centre. The piston 3 continues the movement towards the bottom dead centre and when it reaches a second position, below the first position, the inlet port 19' arranged in the cylinder wall 2' is opened. The inlet port 19' is fluidly connected to the crankcase 5 via the scavenging channel 19. The air/fuel mixture in the crankcase 5 is forced to flow into the cylinder 2 via the inlet port 19' by the overpressure in the crankcase 5.

As can be seen in FIG. 2, in this type of engine 1, the exhaust port 16, and the inlet port 19' in the cylinder 2 are open simultaneously in the scavenging phase of the engine 1, i.e. when the piston 3 is in the region of a bottom dead centre. As a result thereof, some air/fuel mixture may flow through the cylinder 2 from the inlet port 19 to the exhaust port 16 in the scavenging phase. However, since clean air, i.e. air without added fuel, has flowed into the scavenging channel 19 via the inlet port 19' when the piston 3 was in the region of the top dead centre, clean air will first enter the cylinder 2, when the inlet port 19' is opened in the scavenging phase. In this manner, the amounts of unburnt hydrocarbons generated by the engine 1 is significantly reduced. This because a lower amount of air/fuel mixture will flow through the cylinder 2 from the inlet port 19 to the exhaust port 16 in the scavenging phase.

When the piston 3 moves from the bottom dead centre towards the top dead centre, the mantle surface 21 of the piston 3 closes the inlet port 19' and then the exhaust port 16 and the air/fuel mixture in the cylinder is compressed by the movement of the piston 3 towards the top dead centre. When the piston reaches a certain position in the cylinder 2, usually a number of crank angle degrees before top dead centre, the air/fuel mixture is ignited by the spark plug 8. The increased pressure and temperature in the cylinder 2 are partially converted into mechanical work supplied to the crankshaft 10 during movement of the piston 3 from the top dead centre towards the bottom dead centre. The component 18 indicated in FIG. 2 and FIG. 3 is a decompression valve 18 used to facilitate start-up of the engine 1 by reducing the compression of the engine 1.

Since the engine 1 comprises one throttle 13 configured to control the amount of air supplied to the air inlet 9 as well as configured to control the amount of air supplied to the stratified scavenging intake 11, the need for a separate throttle device for controlling the amount of air supplied to the stratified scavenging intake 11 is circumvented. As a result, an engine 1 is provided having conditions for generating low amounts of unburned hydrocarbon during operation while the engine 1 has conditions and characteristics suitable for being manufactured and assembled in a cost-efficient manner.

Moreover, since the need is circumvented for a separate throttle device for controlling the amount of air supplied to the stratified scavenging intake 11, an engine 1 is provided having conditions for a reduced weight. In addition, since the need for a separate throttle device is circumvented for controlling the amount of air supplied to the stratified scavenging intake 11, an engine 1 is provided having conditions for a simplified maintenance and repair.

Figure 6:
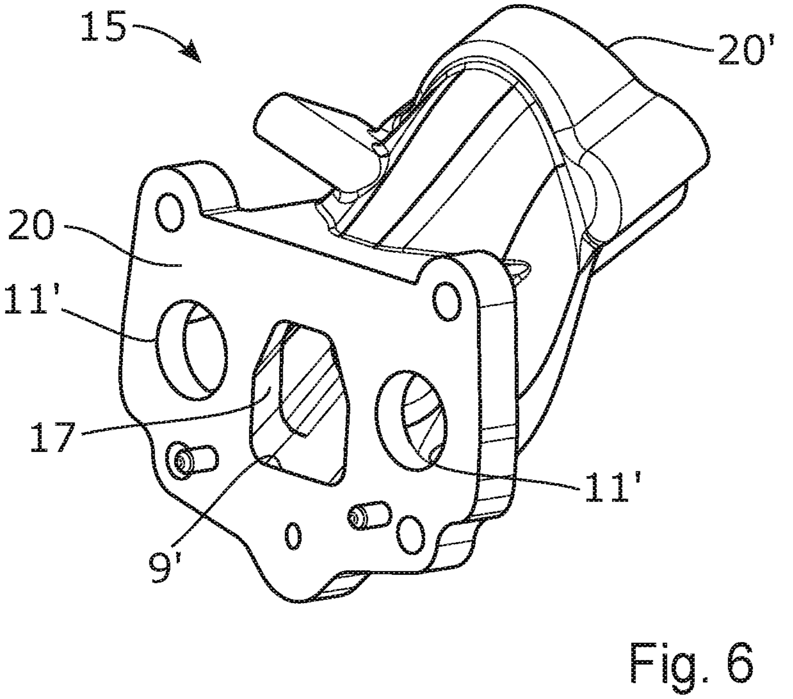
FIG. 6 illustrates a perspective view of a manifold, according to the embodiments illustrated in FIG. 1-FIG. 3.

FIG. 6 illustrates a perspective view of the manifold 15, according to the embodiments illustrated in FIG. 1-FIG. 3. Below, simultaneous reference is made to FIG. 6 and FIG. 1-FIG. 5. The manifold 15 comprises a first flange 20 for connection to the cylinder 2 and a second flange 20' for connection to the throttle 13 indicated in FIG. 2 and FIG. 3. The first flange 20 comprises an air inlet aperture 9' and two stratified scavenging intake apertures 11'. The air inlet aperture 9' is arranged to face and connect to the air inlet 9 of the engine 1 and each of the stratified scavenging intake apertures 11' is arranged to face and connect to a stratified scavenging intake 11 of the engine 1. According to the illustrated embodiments, the engine 1 comprises two stratified scavenging intakes 11, two recesses 23 in the mantle surface 21 of the piston 3 and two scavenging channels 19. These structures may be of identical but mirrored design. For the reason of brevity and clarity, one of the two stratified scavenging intakes 11, one of the two recesses 23, and one of the two scavenging channels 19 is in some places referred to herein. Moreover, according to further embodiments of the present disclosure, the engine 1 may comprise one stratified scavenging intake 11, one recess 23 in the mantle surface 21 of the piston 3 and one scavenging channel 19.

According to the illustrated embodiments, the manifold 15 is provided in an elastic material, such as rubber, e.g. nitrile butadiene rubber (NBR) or any other suitable material known in the field. In this manner, low amount of vibrations will be transferred from the cylinder 2 to the throttle 13, and thereby also to an air filter arrangement which may be attached to the throttle 13.

Moreover, as seen in FIG. 6, the manifold 15 comprises separation walls 17 between the air inlet 9 and the stratified scavenging intake apertures 11'. As is further explained herein, the separation walls 17 reduces the occurrence of spit back in a simple and efficient manner. Spit back is a term describing events where fuel and/or an air/fuel mixture is transferred from the crankcase 5 to the stratified scavenging intake 11 via the air intake 9. Spit back usually causes a higher fuel proportion in the cylinder 2 of the engine 1, which in turn may increase the amount of unburned hydrocarbon generated during operation of the engine 1.

Figure 7:
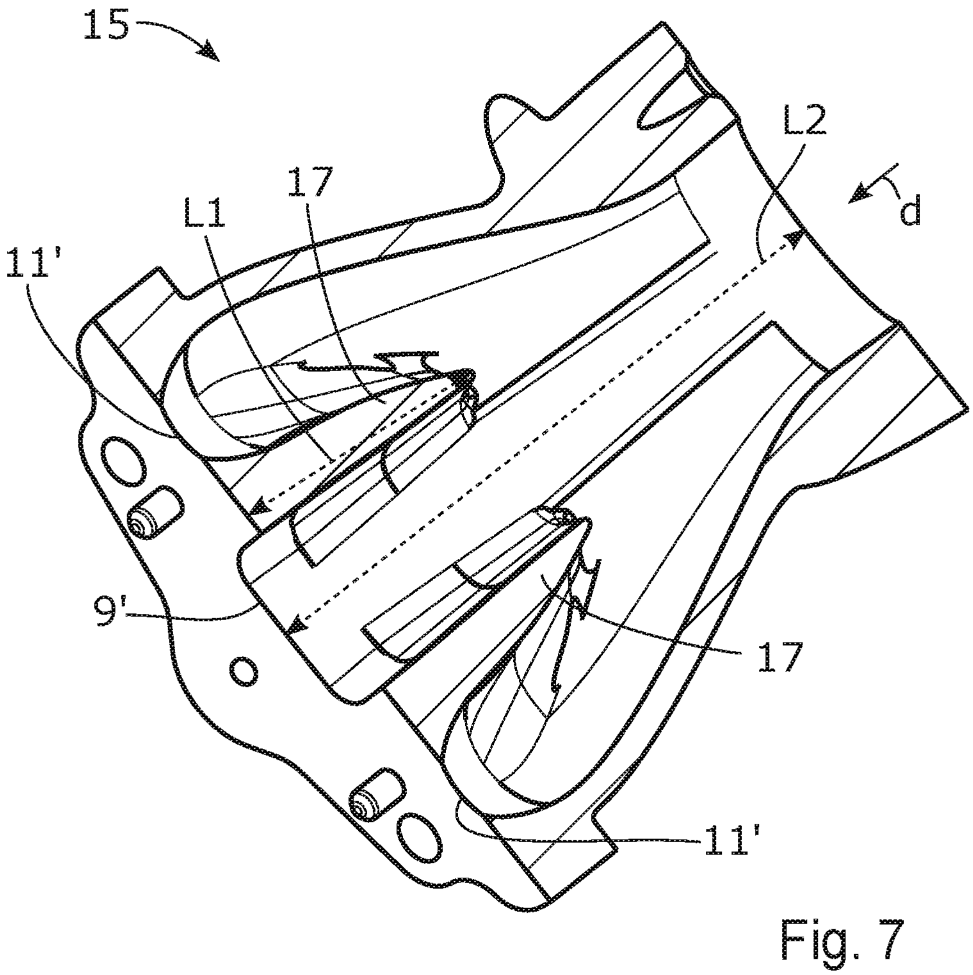
FIG. 7 illustrates a cross section of a manifold according to some embodiments, FIG. 8 schematically illustrates an air intake arrangement according to some embodiments of the present disclosure.

FIG. 7 illustrates a cross section of a manifold 15 according to some embodiments. Below, simultaneous reference is made to FIG. 7 and FIG. 1-FIG. 6. According to the illustrated embodiments, the length L1 of the separation wall 17, measured in an intended air flow direction d through the manifold 15, is approximately 40% of the length L2 of the manifold 15 measured in the intended air flow direction d through the manifold 15. According to further embodiments, the length L1 of the separation wall 17, measured in an intended air flow direction d through the manifold 15, may be within the range of 4-60%, such as within the range of 10-50%, of the length L2 of the manifold 15 measured in the intended air flow direction d through the manifold 15. Moreover, according to some embodiments of the present disclosure, the length L1 of the separation wall 17, measured in an intended air flow direction d through the manifold 15, may be within the range of 60-100% of the length L2 of the manifold 15 measured in the intended air flow direction d through the manifold 15. Thus, according to some embodiments of the present disclosure, the separation wall 17 may extend all the way from the air inlet 9 and the stratified scavenging intake 11 to the throttle 13.

The length L1 of the separation wall 17 will control the amount of spit back and will control at which rotational speed of the engine 1 the spit back will occur. The manifold 15, as referred to herein, can be provided in different versions having different lengths L1 of the separation wall 17. That is, the manifold 15, as referred to herein, can be provided in versions having short length L1 of the separation wall 17, which provides more spit back from the crankcase to the stratified scavenging intake 11, which in turn gives a higher fuel proportion at lower rotational speeds of the engine 1. Moreover, the manifold 15, as referred to herein, can be provided in versions having longer length L1 of the separation wall 17, which provides less spit back from the crankcase 5 to the stratified scavenging intake 11, which in turn gives a leaner air/fuel mixture at lower rotational speeds of the engine 1. In this manner, the response and characteristics of an engine 1 can be changed between different applications of the engine 1 without having to change the design of the cylinder 2. In this manner, engines 1 for different applications with different response and characteristics can be provided in a cost-efficient manner.

According to further embodiments of the present disclosure, the engine 1 may comprises a separation wall between the air inlet 9 and the stratified scavenging intake 11 arranged at another location of the engine 1 than in the manifold 15.

Figure 8:
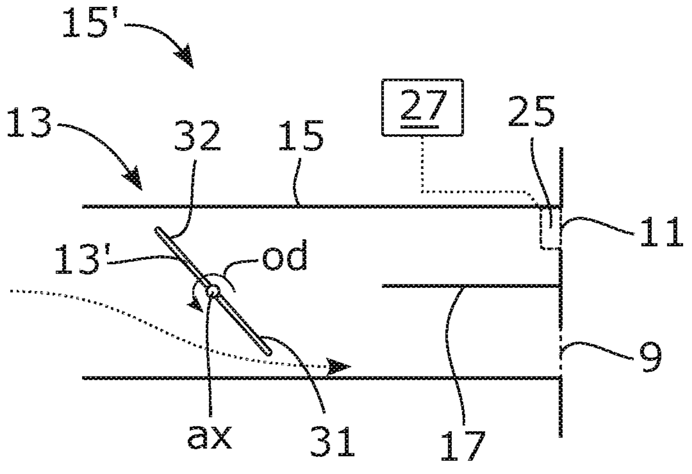

FIG. 8 schematically illustrates an air intake arrangement 15' according to some embodiments of the present disclosure. The engine 1 according to the embodiments described with reference to FIG. 1-FIG. 7 may comprise the intake arrangement 15' illustrated in FIG. 8. Therefore, in the following, simultaneous reference is made to FIG. 1-FIG. 8. The intake arrangement 15' comprises a manifold 15 and a throttle 13. According to the embodiments illustrated in FIG. 8, as well as in FIG. 2 and FIG. 3, the throttle 13 comprises a butterfly valve element 13'. As indicated in FIG. 8, the butterfly valve element 13' is pivotally arranged around a pivot axis ax. The butterfly valve element 13' is connected to a throttle actuator and can be displaced between a closed position and an open position via actuation of the throttle actuator. In FIG. 8, the butterfly valve element 13' is illustrated in a partially open position.

The butterfly valve element 13' comprises a first portion 31 facing the air inlet 9 and a second portion 32 facing the stratified scavenging intake 11. The throttle 13 is arranged such that the first portion 31 is moved in a direction towards the air inlet 9 and the second portion 32 of the butterfly valve element 13' is moved in a direction away from the stratified scavenging intake 11 when the butterfly valve element 13' is pivoted from a closed position towards an open position in an opening direction od. Thereby, an engine 1 is provided having conditions for an improved engine response while generating low amounts of unburned hydrocarbon during operation. Moreover, an engine 1 is provided having conditions for a facilitated start-up thereof. This because more air will be directed towards the air inlet 9 than what is directed towards the stratified scavenging intake 11 when the butterfly valve element 13' is in an at least partially closed position. In addition, an engine 1 is provided in which the proportion of air supplied to the air inlet 9 and to the stratified scavenging intake 11 is changed when changing the opening degree of the throttle 13. According to further embodiments, the throttle 13 may comprise another type of valve element than a butterfly valve element 13', such as a valve element arranged to move in a linear motion upon actuation of a throttle actuator. Also according to such embodiments, the throttle may be arranged such that more air is directed towards the air inlet 9 than what is directed towards the stratified scavenging intake 11 when the throttle is in an at least partially closed position, such that the proportion of air supplied to the air inlet 9 and to the stratified scavenging intake 11 is changed when changing the opening degree of the throttle 13, and/or such that the flow rate of air to the air inlet 9 is higher than the flow rate of air to the stratified scavenging intake 11 when throttle 13 is in a half open position. Moreover, the distance from the throttle 13 to the air inlet 9 and the stratified scavenging intake 11, as well as the length of the separation wall 17 may be adapted to obtain, or enhance, the above mentioned effects.

According to the embodiments illustrated in FIG. 8, the engine 1 comprises a valve 25 arranged between the throttle 13 and the stratified scavenging intake 11. The valve 25 is controllable to a state in which the valve 25 at least partially blocks flow of air to the stratified scavenging intake 11. According to the illustrated embodiments, the valve 25 is a solenoid controlled valve 25. Moreover, according to the embodiments illustrated in FIG. 8, the engine 1 comprises a control arrangement 27 configured to control the valve 25 based on a rotational speed of the engine 1. Thereby, an engine 1 is provided in which the response of the engine 1 is controlled in a simple and efficient manner.

The control arrangement 27 may be configured to control the valve 25 to the state in which the valve 25 at least partially blocks flow of air to the stratified scavenging intake 11 when the rotational speed of the engine 1 is above a first threshold rotational speed. Purely as an example, the first threshold rotational speed may be within the range of 10 000-15 000 revolutions per minute, or within the range of 14 000-15 000 revolutions per minute. In this manner, an engine 1 is provided in which the rotational speed of the engine 1 is limited in a simple and environmentally friendly manner. This because the at least partial block of the flow of air to the stratified scavenging intake 11 will result in a higher fuel proportion in the cylinder 2 which reduces the combustion temperature in the cylinder 2 and reduces the power output of the engine 1. Previously, the rotational speed of two-stoke engines usually has been limited by cancelling ignition of a spark plug of the engine. Such a limitation of the rotational speed of an engine causes significant amounts of unburnt hydrocarbons.

As an alternative, or in addition, to the above described, the control arrangement 27 may be configured to control the valve 25 to the state in which the valve 25 at least partially blocks flow of air to the stratified scavenging intake 11 when the rotational speed of the engine 1 is below a second threshold rotational speed. Purely as an example, the second threshold rotational speed may be within the range of 20-50 revolutions per second, or within the range 25-45 revolutions per second. In this manner, more fuel is obtained upon start-up of the engine 1 which can facilitate start-up of the engine 1.

Figure 9:
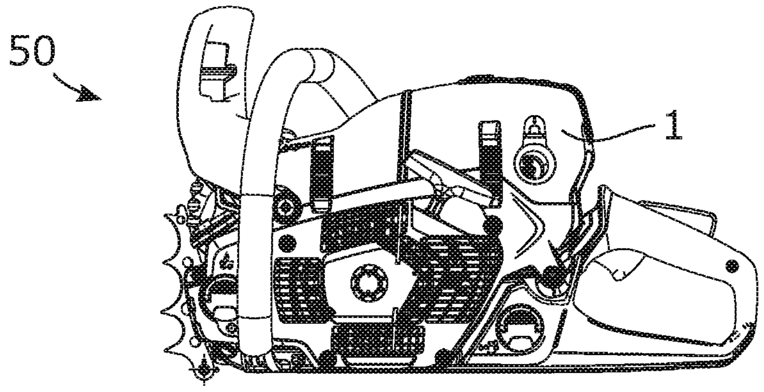
FIG. 9 illustrates a handheld power tool according to some embodiments.

FIG. 9 illustrates a handheld power tool 50 according to some embodiments. The handheld power tool 50 may comprise an engine 1 according to the embodiments described with reference to FIG. 1-FIG. 8. According to the illustrated embodiments, the handheld power tool 50 is a chainsaw. According to further embodiments, the handheld power tool 50, as referred to herein, may be another type of portable tool such as a power cutter, a hedge trimmer, a leaf blower, a multi-tool, or the like.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components, or functions but does not preclude the presence or addition of one or more other features, elements, steps, components, functions or groups thereof.

The invention claimed is:

1. A two-stroke engine comprising:

a cylinder, a piston arranged to reciprocate in the cylinder, a crankcase, a fuel injector configured to inject fuel into the crankcase, an air inlet connected to the crankcase, and a stratified scavenging intake connected to the cylinder, wherein the engine comprises a throttle configured to control the amount of air supplied to the air inlet and to the stratified scavenging intake, and wherein the throttle is arranged such that more air is directed to the air inlet than to the stratified scavenging intake when the throttle is in a half open position, wherein the engine comprises a manifold arranged between the throttle and the air inlet and the stratified scavenging intake, wherein the engine comprises a separation wall between the air inlet and the stratified scavenging intake, wherein the throttle does not contact the separation wall in any position, wherein a length of the separation wall, measured in an intended air flow direction through the manifold, is within a range of 4-60%, of a length of the manifold measured in the intended air flow direction through the manifold in order to provide a balanced amount of spit back to occur through the manifold for efficient operation of the engine at all rotational speeds of the engine.

2. The engine according to claim 1, wherein the manifold comprises the separation wall.

3. The engine according to claim 2, wherein the manifold is provided in an elastic material.

4. The engine according to claim 1, wherein the piston is arranged to reciprocate between a bottom dead centre and a top dead centre in the cylinder, wherein the engine comprises a scavenging channel configured to conduct an air fuel mixture from the crankcase to the cylinder when the piston is in a region of the bottom dead centre, and wherein the piston comprises a mantle surface provided with an aperture arranged to superimpose the stratified scavenging intake and the scavenging channel when the piston is in a region of the top dead centre.

5. The engine according to claim 1, wherein the engine comprises a valve arranged between the throttle and the stratified scavenging intake, and wherein the valve is controllable to a state in which the valve at least partially blocks flow of air to the stratified scavenging intake.

6. The engine according to claim 5, wherein the valve is a solenoid controlled valve.

7. The engine according to claim 5, wherein the engine comprises a control arrangement configured to control the valve based on a rotational speed of the engine.

8. The engine according to claim 1, wherein the throttle comprises a butterfly valve element.

9. The engine according to claim 8, wherein the butterfly valve element comprises a first portion facing the air inlet and a second portion facing the stratified scavenging intake, and wherein the throttle is arranged such that the first portion is moved in a direction towards the air inlet and the second portion of the butterfly valve element is moved in a direction away from the stratified scavenging intake when the butterfly valve element is rotated from a closed position towards an open position.

10. A handheld power tool comprising the engine according to claim 1.

11. The handheld power tool according to claim 10, wherein the handheld power tool is a chainsaw or a power cutter.

* * * * *